US007957378B2

(12) United States Patent
Panigrahy

(10) Patent No.: US 7,957,378 B2
(45) Date of Patent: Jun. 7, 2011

(54) STATEFUL FLOW OF NETWORK PACKETS WITHIN A PACKET PARSING PROCESSOR

(75) Inventor: Rina Panigrahy, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 1168 days.

(21) Appl. No.: 10/927,602

(22) Filed: Aug. 25, 2004

(65) Prior Publication Data
US 2005/0238022 A1   Oct. 27, 2005

Related U.S. Application Data

(62) Division of application No. 10/832,796, filed on Apr. 26, 2004.

(51) Int. Cl.
*H04L 12/56* (2006.01)
(52) U.S. Cl. .......... 370/392; 709/227; 726/1; 726/3
(58) Field of Classification Search .......... None
See application file for complete search history.

(56) References Cited

U.S. PATENT DOCUMENTS

| 5,414,650 | A | * | 5/1995 | Hekhuis | 708/203 |
|---|---|---|---|---|---|
| 5,748,905 | A | | 5/1998 | Hauser et al. | |
| 6,335,935 | B2 | * | 1/2002 | Kadambi et al. | 370/396 |
| 6,480,489 | B1 | * | 11/2002 | Muller et al. | 370/389 |
| 6,859,455 | B1 | * | 2/2005 | Yazdani et al. | 370/392 |
| 6,904,057 | B2 | * | 6/2005 | Sarkinen et al. | 370/469 |
| 6,952,425 | B1 | * | 10/2005 | Nelson | 370/429 |
| 6,952,756 | B1 | | 10/2005 | Le | |
| 7,089,486 | B1 | * | 8/2006 | Marleux et al. | 714/807 |
| 7,187,694 | B1 | * | 3/2007 | Liao | 370/474 |
| 2003/0185220 | A1 | * | 10/2003 | Valenci | 370/398 |
| 2004/0199630 | A1 | * | 10/2004 | Sarkissian et al. | 709/224 |
| 2005/0122918 | A1 | * | 6/2005 | Johnston | 370/310 |

OTHER PUBLICATIONS

PCT International Search Report and Written Opinion, PCT/US05/13191, Dec. 18, 2006, 10 pages.

* cited by examiner

*Primary Examiner* — Daniel J Ryman
*Assistant Examiner* — Brian Roberts
(74) *Attorney, Agent, or Firm* — Patterson & Sheridan, LLP

(57) ABSTRACT

The present invention provides a packet processing device and method. A parsing processor provides instruction-driven content inspection of network packets at 10-Gbps and above with a parsing engine that executes parsing instructions. A flow state unit maintains statefulness of packet flows to allow content inspection across several related network packets. A state-graph unit traces state-graph nodes to keyword indications and/or parsing instructions. The parsing instructions can be derived from a high-level application to emulate user-friendly parsing logic. The parsing processor sends parsed packets to a network processor unit for further processing.

23 Claims, 7 Drawing Sheets

STATEFUL FLOW OF NETWORK PACKETS WITHIN A PACKET PARSING PROCESSOR

CROSS-REFERENCE TO RELATED APPLICATION

This is a divisional application under 35 U.S.C. §121 of U.S. patent application Ser. No. 10/832,796, filed on Apr. 26, 2004, entitled "Programmable Packet Parsing Processor," by Rina Panigrahy et al., the entire contents of which are hereby incorporated by reference.

BACKGROUND OF THE INVENTION

1. Field of the Invention

This invention relates generally to a computer processor, and more specifically, to a packet parsing processor including a parsing engine to perform content inspection on network packets with an instruction set that provides programmable parsing operations.

2. Description of Related Art

Until recently, a lack of network bandwidth posed restraints on network performance. But emerging high bandwidth network technologies now operate at rates that expose limitations within conventional computer processors. Even high-end network devices using state of the art general purpose processors are unable to meet the demands of networks with data rates of 2.4-Gbps, 10-Gbps, 40-Gbps and higher.

Network processors are a recent attempt to address the computational needs of network processing which, although limited to specialized functionalities, are also flexible enough to keep up with often changing network protocols and architecture. Compared to general processors performing a variety of tasks, network processors primarily perform packet processing tasks using a relatively small amount of software code. Examples of specialized packet processing include packet routing, switching, forwarding, and bridging. Some network processors even have arrays of processing units with multithreading capability to process more packets at the same time. As network processors have taken on additional functionalities, however, what was once a specialized device responsible for a few tasks has matured into a general processing device responsible for numerous network processing tasks.

Consequentially, network processors are unable to perform application-level content inspection at high data rates. Application-level content inspection, or deep content inspection, involves regular expression matching of a byte stream in a data packet payload. An instruction set in a network processor is designed for general purpose network tasks, and not specifically for packet parsing. Thus, general purpose code used for parsing tasks is inefficient. Furthermore, content inspection is a computationally intensive task that dominates network processor bandwidth and other resources. In order to provide additional packet parsing functionality on the network processor, even more resources would need to be taken from other network processing tasks. Consequentially, current network processors are not suited for deep content inspection at high speeds.

Moreover, current processors that are dedicated to parsing packets lack flexibility for adaptability to new signatures and protocols. These processors are instead hard-wired to handle state of the art signatures and protocols known at production time. Software used for packet processing can adapt to changes, but does not perform at a high enough data rate.

Accordingly, there is a need for a robust packet processor that provides the flexibility and performance rate to perform content inspection concomitant with current and future networking demands. Furthermore, this solution should provide programmability to enhance traditional regular expression matching operations.

SUMMARY OF THE INVENTION

The present invention meets these needs by providing a dedicated parsing processor and method of parsing packets to meet the above needs. In one embodiment, the parsing processor provides instruction-driven content inspection of network packets with parsing instructions. The parsing processor can maintain statefulness of packet flows to perform content inspection across several related network packets as a single byte stream. The parsing processor traces state-graph nodes to determine which parsing instructions to fetch for execution. The parsing processor can exchange packets or other control information to a network processor for additional processing. In one embodiment, the parsing processor performs tasks such as intrusion detection and quality of service at a network speed of 10-Gbps.

In another embodiment, the parsing instructions program a parsing engine to control tasks such as regular expression matching tasks and more. Another embodiment of the parsing instructions is derived from a high-level application recognition software program using graph-based recognition. As such, the parsing instructions comprise high-level software instructions compiled into machine code.

In still another embodiment, the parsing processor comprises a flow state unit having an input/output coupled to a first input/output of the parsing engine. The flow state unit stores a parsing context including a parser state for packet flows. When a packet from a stateful flow is received by the parsing engine, the flow state unit sends the parsing context. Register banks include scratchpads for storing parsing context and other data used during parsing computations.

In yet another embodiment, the parsing processor comprises a state-graph unit having an input/output coupled to a second input/output of the parsing engine. The state-graph unit stores parsing instructions at state addresses representing nodes. As a result, the parsing engine is able to trace state nodes through character transitions of, for example, a state machine or Deterministic Finite Automata to a next state containing a next parsing instruction. Processor cores execute the parsing instruction against a byte stream of characters to, for example, identify a regular expression match. In one embodiment, the state-graph unit stores encoded instructions. States with more than five next states are encoded as a bitmap. A single bit in the bitmap can represent whether at least one of a set of characters contain a transition. Using the bitmap, 32-bits can represent 256 transitions rather than 2,048-bits. Another embodiment of the state-graph unit comprises ten FCRAMs (Fast Cycle Random Access Memories) providing approximately 10-Gbps throughput.

In another embodiment, the parsing engine comprises a hash unit. The processor cores generate a key for hash unit look-ups by concatenating, for example, registers in the register bank. The hash unit outputs a next state corresponding to the key. Another embodiment of the hash table comprises a TCP flow table or a port table indexed by protocol type, destination IP address, destination port address, source IP address, and/or source port address.

DETAILED DESCRIPTION OF THE PREFERRED EMBODIMENTS

A system and method for parsing network packets are disclosed. Some embodiments of the system are set forth in FIGS. 1-2, and some embodiments of the method operating therein are set forth in FIGS. 3-7. The accompanying description is for the purpose of providing a thorough explanation with numerous specific details. Of course, the field of network processing is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. Accordingly, the present invention should not be understood as being limited to the specific implementations described below, but only by the claims that follow.

The processes, features, or functions of the present invention can be implemented by program instructions that execute in an appropriate computing device described below. The program instructions can be distributed on a computer readable medium, within a semiconductor device, or through a public network. Program instructions can be in any appropriate form, such as source code, object code, or scripts.

Figure 1:
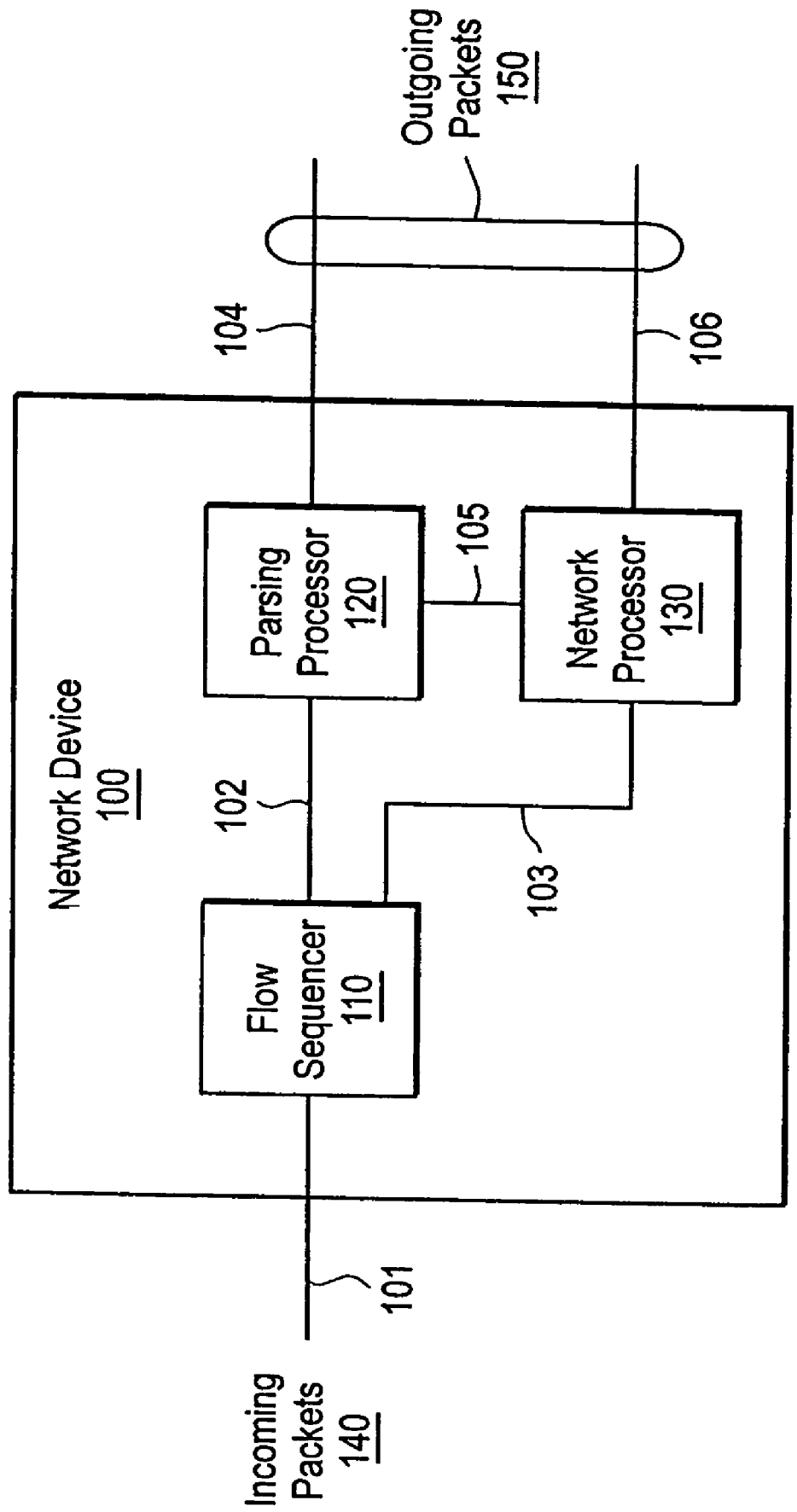
FIG. 1 is a block diagram illustrating a network device according to one embodiment of the present invention.

FIG. 1 is a block diagram illustrating a network device 100 according to one embodiment of the present invention. The network device 100 operates to service high-speed networks with bandwidths of 2.4-Gbps, 10-Gbps, 40-Gbps, and above. The network device 100 can also provide services such as application recognition, quality of service guarantees, application-level firewalls, network-based intrusion detection, and the like. The network device 100 processes incoming packets 140 received from a network (not shown) to perform various tasks such as routing, switching, bridging, and packet forwarding using various network protocols such as TCP/IP (Transmission Control Protocol/Internet Protocol), ATM (Asynchronous Transfer Mode), IEEE 802.3, IEEE 802.11, etc. The network device 100 sends processed outgoing packets 150 to the network. Although the network device 100 is shown to process one-way network traffic, another embodiment of the network device 100 processes two-way network traffic. The system 100 can comprise a specialized device such as a router, a switch, a bridge, a gateway, or a combination device such as the 12000-series systems manufactured and sold by Cisco Systems, Inc. of San Jose, Calif.

More specifically, the network device 100 comprises a flow sequencer unit 110, a parsing processor 120, and a network processor unit 130 implemented as either hardware or software, alone or in combination. The components can also be implemented as a semiconductor, a field programmable device, a nanotechnology-based circuit, or any other type of circuit for implementing logic functionality at high data rates. The network device 100 components comprise, for example, separate integrated circuits attached to a common motherboard, several modules of a single integrated circuit, or even separate devices. In one embodiment, the network device 100 comprises additional components such as an operating system, co-processors, a CAM (Content Addressable Memory), a search engine, a packet buffer or other type of memory, and the like.

In FIG. 1, a signal line 101 is coupled to an input of the flow sequencer unit 110, which forms an input of the network device 100, to carry optical, electrical, or other signals that represent incoming packets 140. Another signal line 102 couples a first output of the flow sequencer unit 110 to an input of the parsing processor 120. Still another signal line 103 couples a second output of the flow sequencer 103 to an input of the network processor 130. Yet another signal line 105 couples an input/output of the parsing processor 120 to an input/output of the network processor unit 130. Signal lines 104, 106 are coupled to outputs of the parsing processor 120 and the network processing unit 130, forming first and second outputs of the network device 100, to carry representations of outgoing packets 150. The signal lines 101-106 discussed here and signal lines discussed elsewhere comprise, for example, buses, dedicated paths, copper traces, and the like. Of course, the specific couplings signal lines 101-106 and other signal lines are example configurations and can vary without departing from the scope of the present invention. In operation, a data path flows from the flow sequencer unit 110 to the parsing processor 120 and, alternatively, to the network processor unit 130. By off-loading tasks from the network processor unit 130, the parsing processor 120 increases the network device 100 speed and efficiency, so that it can handle network speeds of 10-Gbps and more.

The flow sequencer unit 110 tracks packet flows and identifies packets within a common flow, referred to as stateful packets. For example, individual packets for a video chat session or a secured transaction originate from the same source IP address and terminate at the same destination IP address and port. The flow sequencer unit 110 can use packet headers or explicit session indicators to correlate individual packets. In addition, the flow sequencer unit 110 can manipulate packet headers or otherwise indicate packet statefullness to the parsing processor 120.

The parsing processor 120 parses packet content, using instruction-driven packet processing. This functionality can also be described as deep packet forwarding or deep packet parsing to indicate that packet inspection can include not only packet headers, but also data within packet payloads. The parsing processor 120 recognizes applications based on content contained within a packet payload such as URLs, application-layer software communication, etc. As a result, the parsing processor 120 can send messages to the network processor unit 130 such as a priority or quality of service indication, yielding better performance for the network application. In addition, the parsing processor 120 can recognize signatures for viruses or other malicious application-layer content before it reaches a targeted host. Such network based intrusion detection provides better network security.

In one embodiment, the parsing processor 120 increases parsing efficiency by encoding character transitions. For example, rather than storing all possible 256 character transitions, the parsing processor 120 stores actual character transitions, or indications of which characters have transitions rather than the character transition itself. Because less data is needed in a state-graph constructed from character transitions, a memory can store more signatures and the parsing processor 120 can trace the memory at an increased rate. In another embodiment, the parsing processor 130 uses parsing instructions to perform regular expression matching and enhanced regular expression matching tasks. In still another embodiment, the parsing processor 130 emulates application recognition of high-level software which uses state-graph nodes. Accordingly, the parsing processor 120 executes parsing instructions based on complied high-level instructions or description language script. The parsing processor 120 is described in greater detail below with respect to FIG. 2.

The network processor unit 130 executes general network processing operations on packets. The network processor unit 130 comprises, for example, an x86-type processor, a network processor, a multithreaded processor, a multiple instruction multiple data processor, a general processing unit, an application specific integrated circuit, or any processing device capable of processing instructions.

Figure 2:
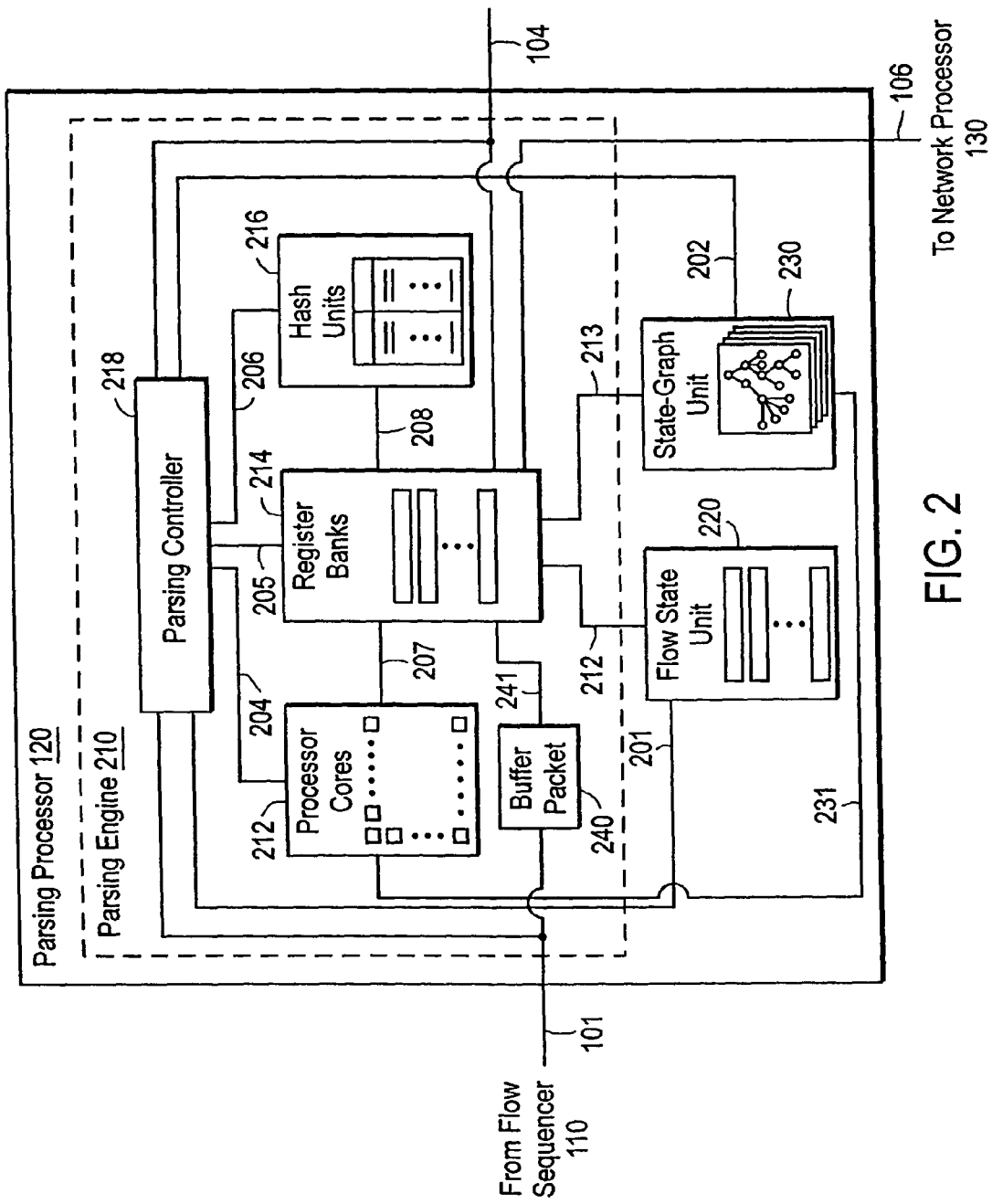
FIG. 2 is a block diagram illustrating the parsing processor according to one embodiment of the present invention.

FIG. 2 is a block diagram illustrating the parsing processor 120 according to one embodiment of the present invention. The parsing processor 120 comprises a parsing engine 210, a flow state unit 220, and a state-graph unit 230. The parsing engine 210 further comprises a parsing controller 218, processor cores 212, register banks 214, a hash unit 216, and a packet buffer 240. Signal lines 101, 201, 204, 205, 206, 202, 104 couple input/outputs of the parsing controller 218 to the flow sequencer 110, the flow state unit 220, the processor cores 212, the register banks 214, the hash units 216, the state-graph unit 230, and the network processor 130. Also, signal lines 207, 208, 241, 212, 213, 106, 104 connect input/outputs of the register banks 214 to the processor cores 212, the hash units 216, the packet buffer 240, the flow stat unit 220, the state-graph unit 230, the network processor 130, and the first network device 100 output.

The parsing engine 210 controls content inspection of packets and other packet parsing functions. During processing, the parsing engine 210 maintains a parsing context for packets in the register banks 214 as shown below in the example of Table 1:

TABLE 1

Parsing Context for Each Packet

| Field | Size (bytes) | Description |
| --- | --- | --- |
| Pak desc | 4 | Pointer to the current packet being parsed; packet header contains flow-id, packet length |
| State | 8 | Current parse state |
| Bit location | 4 | Current bit location being parsed |
| Bit vector | 8 | Bit vector to reduce overhead of .*s |
| Scratchpad | 64x4 | 64 32-bit registers |
| Classification register | 4 | 32-bit register containing classification |
| Return address register | 4 | Saves return state address; used for function call at depth of one level |
| NP transmit buffer | 16 | Buffer to hold variable sized fields from the byte stream to be send to the network processor unit 130 |

In one embodiment, the parsing engine 210 stores, in the flow state unit 220, parsing context for a packet that is part of a related packet flow. This allows the parsing engine 210 to parse related packets as a single byte stream. When a related packet is received, the parsing engine 210 retrieves parsing context as shown below in the example of Table 2:

TABLE 2

Parsing Context Maintained in Flow State Unit 220

| Field | Size (bytes) | Description |
| --- | --- | --- |
| State | 8 | Current parse state |
| Bit vector | 8 | Bit vector to reduce overhead of .*s |
| 4 registers | 4x4 | 4 32-bit registers |
| Classification register | 4 | 32-bit register containing classification |
| Return address register | 4 | Saves return state address; used for function call at depth of one level |

In another embodiment, the parsing engine 210 determines parsing context from the packet itself as shown in the example of Table 3:

TABLE 3

Parsing Context from Packet Header

| Field | Size (bytes) | Description |
| --- | --- | --- |
| Pak desc | 4 | Packet identifier |
| Parsing mode | 3 | Statefull (proxy mode) or stateless (per packet mode) |
| Initial parse state | 8 | Starting state for per packet mode or first packet of proxy mode |
| Flow_id | 3 | Flow_id used by flow state unit 220 for subsequent packets in flow |
| Packet length | 4 | Length of packet |
| Parsing offset | 4 | Offset from where to begin parsing |

In addition, the parsing engine 210 can retrieve parsing context from the hash unit 216. In one embodiment, the hash unit 216 stores a portion of the parsing context relative to the flow state unit 220. For example, the portion can include just a state address and classification value.

In one embodiment, the parsing context contains a parse state that includes a current state and a next state. The state indicates the state-graph node from which characters will be traced. The next state is a result of the current character (or byte) and the state. An example parse state format that does not include parsing instructions is shown in Table 4:

TABLE 4

Parse State Format Without Instruction

| I-bit = 0 | Reserved | State | Char 0 | Char 1 | Char 2 | Char 3 | Char 4 |
| --- | --- | --- | --- | --- | --- | --- | --- |
| 1-bit | 3-bits | 20-bits | 8-bits | 8-bits | 8-bits | 8-bits | 8-bits |

The parse state is encoded in a format depending on how many state transitions stem from the current state. In a first encoding for less than or equal to five next states, the transition characters themselves are stored in the Char fields. In a second encoding format for between 6 and 256 next states, a bitmap represents which characters have transitions. Parse state encoding is discussed below in more detail with respect to FIG. 4. Additionally, psuedocode for determining a next state from the State field is shown below in Table 6.

In another embodiment, the parser state includes a parsing instruction. The parsing instruction specifies an action or task for the parsing processor 120. An example parse state format that includes an instruction is shown in Table 5:

TABLE 5

Parse State Format with Instruction

| I-bit = 1 | Reserved | State | Instruction |
|---|---|---|---|
| 1-bit | 3-bits | 20-bits | 40-bits |

The parsing engine 210 also feeds state addresses of a node to the state-graph unit 230 and receives related parsing instructions. A "character" as used herein includes alphanumeric text and other symbols such as ASCII characters for any language or code that can be analyzed in whole, byte by byte, or bit by bit. As a result of executing instructions from the state-graph unit 230, the parsing engine 210 takes an action, such as jumping to an indicated state, skipping a certain number of bytes in the packet, performing a calculation using scratchpads, sending a message to the network processor 130, altering a header in the associated network packet by employing network processor 130, etc. The parsing engine 210 can also send state information of parsed packets to the flow state unit 220 for storage.

The processor cores 212 execute instructions, preferably parsing instructions, related to parsing tasks of the parsing engine 210. The processor cores 212 also perform other data manipulation tasks such as fetching parsing instructions from the state-graph unit 230. The processor cores 212 comprise, for example, general processing cores, network processing cores, multiple instruction multiple data cores, parallel processing elements, controllers, multithreaded processing cores, or any other devices for processing instructions, such as an Xtensa core by Tensilica Inc. of Santa Clara, Calif., a MIPS core by MIPS Technologies, Inc. of Mountain View, Calif., or an ARM core by ARM Inc. of Los Gatos, Calif. In one embodiment, the processor cores 212 comprise 120 individual processor cores to concurrently process 120 packets in achieving 10-Gbps throughput.

The register banks 214 provide temporary storage of packet fields, counters, parsing contexts, state information, regular expression matches, operands and/or other data being processed by the processor cores 212. The register banks 214 are preferably located near the processor cores 212 with a dedicated signal line 211 for low latency and high bandwidth data transfers. In one embodiment, a portion of the register banks 214 is set aside for each processor core 212. For example, 120 register banks can support 120 parsing contexts for 10-Gbps throughput. The register banks 214 comprise, for example, 32-bit scratchpads, 64-bit state information registers, 64-bit matched keyword registers, 64-bit vector register, etc.

The hash unit 216 uses a hash table to index entries containing parser states or other parsing instructions, classifications and/or other information by keys. The hash unit 216 receives a key, generated by the processor cores 212, sent from a node in the state-graph machine 230, etc. For example, a processor core 212 obtains a 96-bit key by concatenating an immediate 32-bit (i.e., <immed>) operand from an instruction with 64-bits contained in two 32-bit registers. In one embodiment, the hash unit 216 stores a classification and a parser state for uniform treatment of similarly classified packets. The hash unit 216 can comprise a set of hash tables or a global hash table resulting from a combination of several hash tables including a TCP or other protocol hash table, a destination hash table, a port hash table, a source hash table, etc. When the global table comprises the set of hash tables, the key can be prepended with bits to distinguish between the individual tables without special hardware assist.

In one embodiment, the TCP flow table stores information by key entries comprising, for example, a protocol type, destination IP address, a destination port, source IP address and/or source port. The TCP flow table provides immediate context information, classifications, classification-specific instructions, IP address and/or port specific instructions, and the like. In one embodiment, the hash unit 216 stores parsing instruction such as states in table entries.

The processor cores 212 can implement parsing instructions, or preferably specific hash instructions, on the hash unit 216. Example parsing instructions for the hash unit 216 include instructions to look-up, insert, delete, or modify hash table entries responsive to parsing instructions with a key generated by concatenating an immediate operand with registers.

The flow state unit 220 maintains flow states, or parsing states, for packets that are part of a packet flow for parsing across multiple packets. For example, the flow state unit 220 can store a state or next parsing instruction. The flow state unit 220 receives a flow identifier, which can be part of or related to the flow state information, from the parsing engine 210 to identify an entry. In one embodiment, the flow state information is set by the flow sequencer 110. In either case, the next state information is included in the parsing context sent to the parsing engine 210.

The state-graph unit 230 stores parsing instructions in a data structure as state addresses. For example, the data structure, as executed by the processor cores 212, can be a Finite State Machine, a Deterministic Finite Automata, or any other data structure organized by state nodes and character transitions. Within the state-graph, signatures, URLs or other patterns for recognition are abstracted into common nodes and differentiated by transitions. As the parsing engine 210 fetches instructions, the state-graph unit 230 traces nodes until reaching, for example, a regular expression match, message, etc. embedded in a parsing instruction. The state-graph unit 320 preferably comprises an FCRAM, but can comprise SDRAM, SRAM or other fast access memory. In one embodiment, each often state-graph units 230 provide 120 million 64-bit reads per second to support 10-Gbps throughput.

The parsing instructions, either alone in combination, are descriptions of various tasks for content inspection. Some parsing instructions merely embed data, while others marshal complex calculations. The parsing instructions can store a next state or node as an address. Example categories of the parsing instructions include: register instructions for storing and retrieving packet contents to/from a local scratchpad; ALU instructions for performing comparisons and arithmetic operations including bit vector operations; messaging instructions to programmatically produce messages on events during packet parsing for an external entity (e.g., network processing unit 130) to perform a task based on the event; function call instructions to support subroutines; and hash look-up/update to operate on the hash unit 216 programmatically during packet parsing.

Instructions can be described in a format of INSTR_NAME [<argument>]. Example bit vector instructions include:

Bitvector_OR_hi<immed>; Bitvector_OR_lo<immed>—
    ORs immediate value to upper or lower bits of bit vector;
Bitvector_AND_hi<immed>;
    Bitvector_AND_lo<immed>—ANDs immediate value to upper or lower bits of bit vector;
Bitvector_AND_SHIFT_OR_hi<immed>;

Bitvector_AND_SHIFT_OR_lo<immed>—immediate operand is ANDed with the upper or lower bits of the bit vector; result is right-shifted by 1 and then ORed to the bit vector in place; and Bitvector_to_reg; Bitvector_from_reg; Bitvector_jump_conditional<bit-index>.

Example register instructions include:

Copy_to_scratchpad<address>—copies current byte from packet to specified address in register;

Copy_immed_a<immed>—copies bit operand to a-register;

Copy_scratchpad<from_address><to_address>—copies value from one scratchpad to another;

a<–10a+char–'0'—multiplies current value of a by 10 and adds current character to a number; used to convert string representations of a number to its register value;

Skip_a—skips certain number of bytes in byte stream;

Is_digit—checks to see if current character is a digit; and

Br_a=immed<immed>; Br_a>immed<immed>; Br_a<immed<immed>—compares lower 16 bits of a-register with immediate 16 bit value.

Example function call instructions include:

Call<immed>—save state in return address register; jump to state address in <immed>; and Return—jump to state address in return address register.

Example messaging instructions include:

Send_msg<msg-id>; Halt<msg-id>—send message with message id set to <msg-id>; halts flow and sends message with message id set to <msg-id>; and Tx_buff<msg-id>; Send_tx_buff<msg-id>—transmits bytes from the byte stream; transmits contents of NP_transmit_buff.

Example hash instructions include:

Hash_look-up <immed>—if the key produces a hit in the hash unit 216, next state comprises the state indicated in the entry; if there is a miss, next state comprises the default state;

Hash_insert <immed>—the hash unit 216 inserts (state+1) into an entry associated with the key;

Hash_delete <immed>—the hash unit 216 deletes an entry associated with the key; and Hash_insert_classify <immed>—the hash unit 216 inserts (state+1, classification reg) into an entry associated with the key.

In another embodiment, the state-graph unit 230 supports application discovery emulation of software. Such software can be programmed using a high-level language providing a user-friendly mechanism to specify parsing logic such as regular expression searches and other complex parsing actions. Next, a compiler translates the parsing logic specified in the high-level language into parsing or machine instructions. For regular expressions, the compiler can translate to a DFA. Similarly, other parsing logic needs to be compiled into a graph whose nodes consist of one or more parsing instructions.

Figure 3:
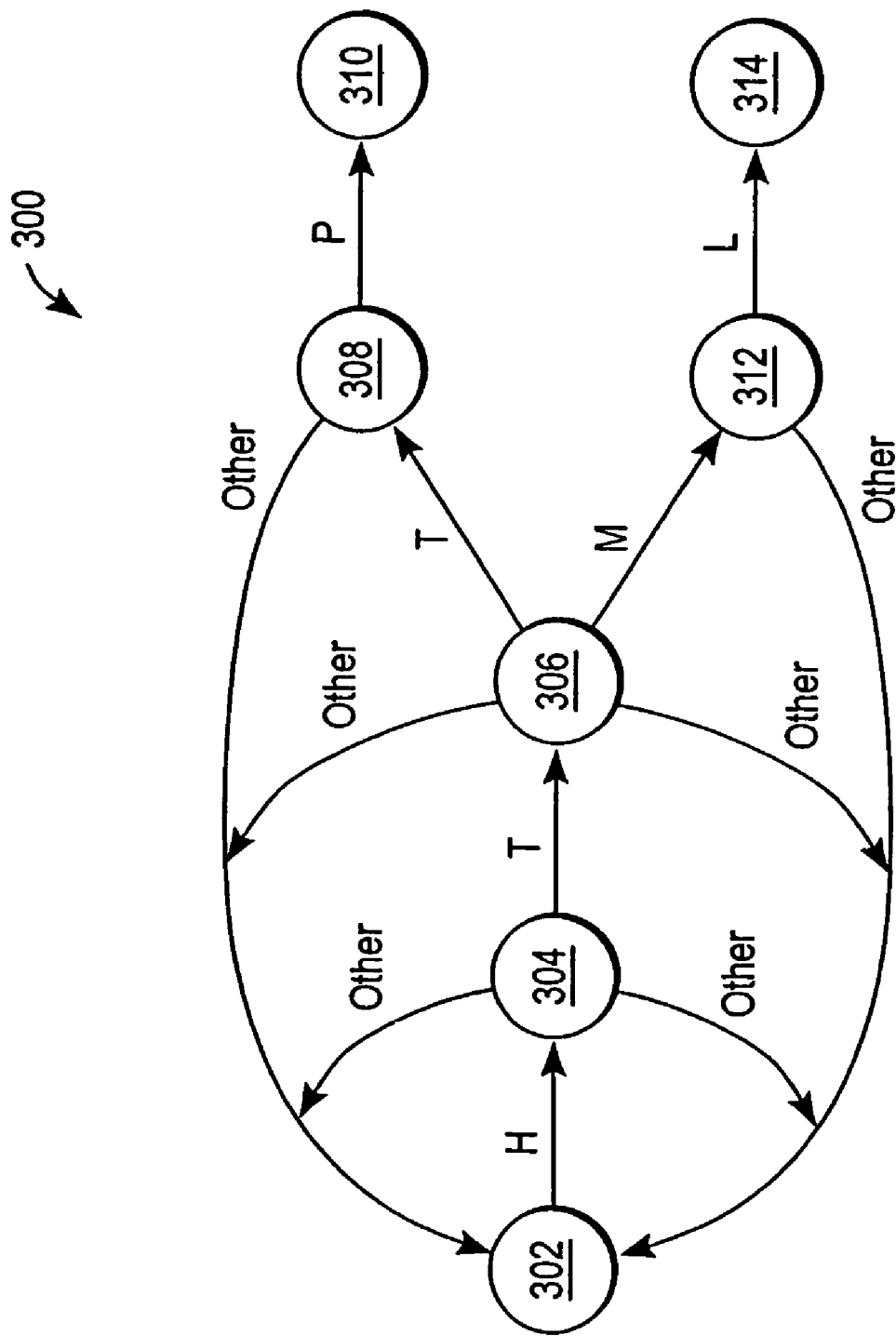
FIG. 3 is a sequence diagram illustrating an example of a state-graph according to one embodiment of the present invention.

FIG. 3 is a sequence diagram illustrating an example of a state-graph 300 according to one embodiment of the present invention. The state-graph 300 combines the expressions "HTTP" and "HTML" into a state machine. Note that state-graphs 300 can combine thousands of expressions comprising hundreds of thousands of characters. The root node 302 as a starting state can have numerous transitions, but responsive the next character being "H", the new state is node 304. Similarly, node 306 is the new state responsive to the character "T" subsequent to "H." However, if a character other than "T" is received, then the new state returns to the root node 302. From node 306, there are two possible transitions, "T" which leads to node 308, and "M" which leads to node 312. If either a "P" follows "HTT" or an "L" follows "HTM", then the new states are match node 310 and match node 314 respectively.

A match node is a state representing a keyword match (i.e., "HTTP" or "HTML"). In one example, the parsing engine 210 writes an address following the keyword "PORT" as used in FTP to a TCP hash table. In another example, a parsing instruction directs the state-graph unit 230 to jump to a different root node to identify the URL following the "HTTP" characters. In yet another example, the parsing engine 210 sends a message to the network processor 230.

Figure 4:
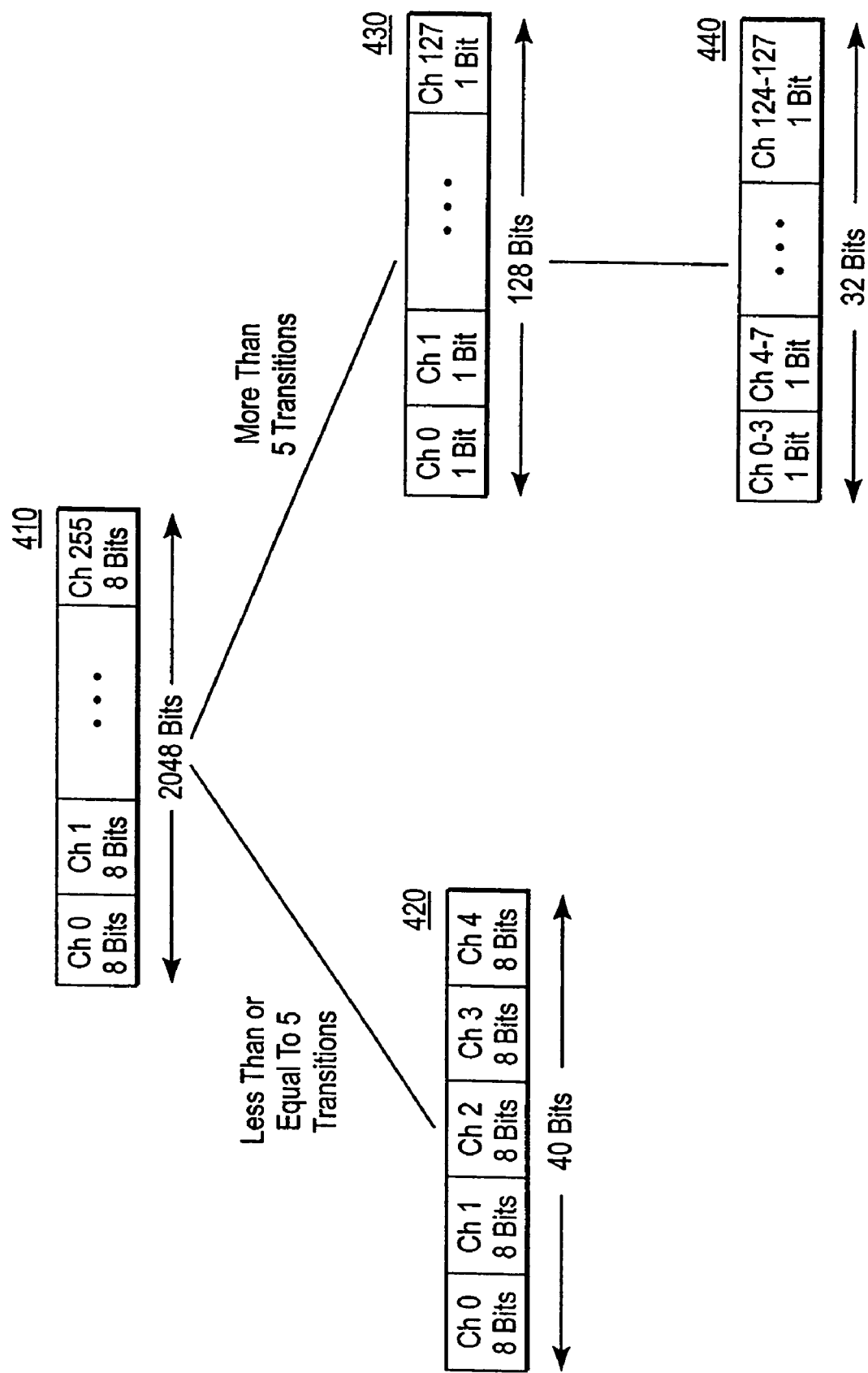
FIG. 4 is a sequence diagram illustrating parse state encoding according to one embodiment of the present invention.

FIG. 4 is a sequence diagram illustrating parse state encoding according to one embodiment of the present invention. Table 410 shows an unencoded parse state. Since the parse state can contain up to 256 transitions based on the 256 characters at 8-bits per character, the parse state consumes 2048 bits of memory. However, the parsing processor 120 encodes parse states for space efficiency.

A first optimization is shown in table 420. In this case, when there are five or less actual transitions, those characters can be stored in 40 bits as shown above in Table 4. A second optimization is shown in tables 430 and 440. In this case, when there are more than five transitions, rather than storing characters, table 430 stores a bitmap of 128-bits. Each bit represents a character. In one example, a character bit is set to "1" if there is a transition for that character, and set to "0" if there is not. The second optimization further compresses data in table 440 where sets of 4 character bits in table 430 are represented by a single bit. Thus, if there is at least one transition with the set of 4 characters, the bit can be set to "1", else it is set to "0". Using this final optimization, the parse state is represented by 32-bits plus an additional bit to indicate whether the table encodes the upper 128 ASCII characters which are commonly used, or the lower 128 ASCII characters which are rarely used. Because encoding greatly reduces the number of bits needed to store next states, the parsing processor 120 can efficiently store a large number of transitions on-chip.

In one embodiment, Char 0 indicates how to determine the next state from the encoded states. For example, if Char 0 is FF, the next state is the state field as shown above in Tale 4. If there are more than five transitions, Char 0 is FE or FD to indicate bit map encoding for the first 128 ASCII characters and the last 128 ASCII characters respectively. Otherwise, the parsing engine 210 assumes that there are less than or equal to five transitions. Psuedocode for this example is shown in Table 6:

TABLE 6

Psuedocode for Determining Parse State

| Case | Psuedocode |
| --- | --- |
| Char 0 is FF | The next state is always State |
| Char 0 is FE | Bit map encoding for transitions on first 128 ASCII characters<br>If char>+128 next state = State<br>   Bitmap = 32 bit encoding in Char 1 to Char 4<br>   If Bitmap[char/4]==0, next state = State<br>   Else<br>      Let count = Number of 1's in Bitmap strictly to the<br>      left of Bitmap [char/4]<br>      Next state = 4*count + char%4 + State + 1 |
| Char 0 is FD | Bit map encoding for transitions on last 128 ASCII characters<br>If char<128 next state = State<br>Else<br>   char = char – 128<br>   Bitmap = 32 bit encoding in Char 1 to Char 4 |

TABLE 6-continued

Psuedocode for Determining Parse State

| Case | Psuedocode |
|---|---|
| | If Bitmap[char/4]==0, next state = State |
| | Else |
| |    Let count = Number of 1's in Bitmap strictly to the left of Bitmap [char/4] |
| |    Next state = 4*count + char%4 + State + 1 |
| Else | Encoding for less than or equal to 5 outgoing transitions |
| | The next state for Char0 if not FF is (State + 1) |
| | The next state for Char1 if not FF is (State + 1) |
| | The next state for Char2 if not FF is (State + 1) |
| | The next state for Char3 if not FF is (State + 1) |
| | The next state for Char4 if not FF is (State + 1) |
| | For all other characters the next state is State |

Figure 5:
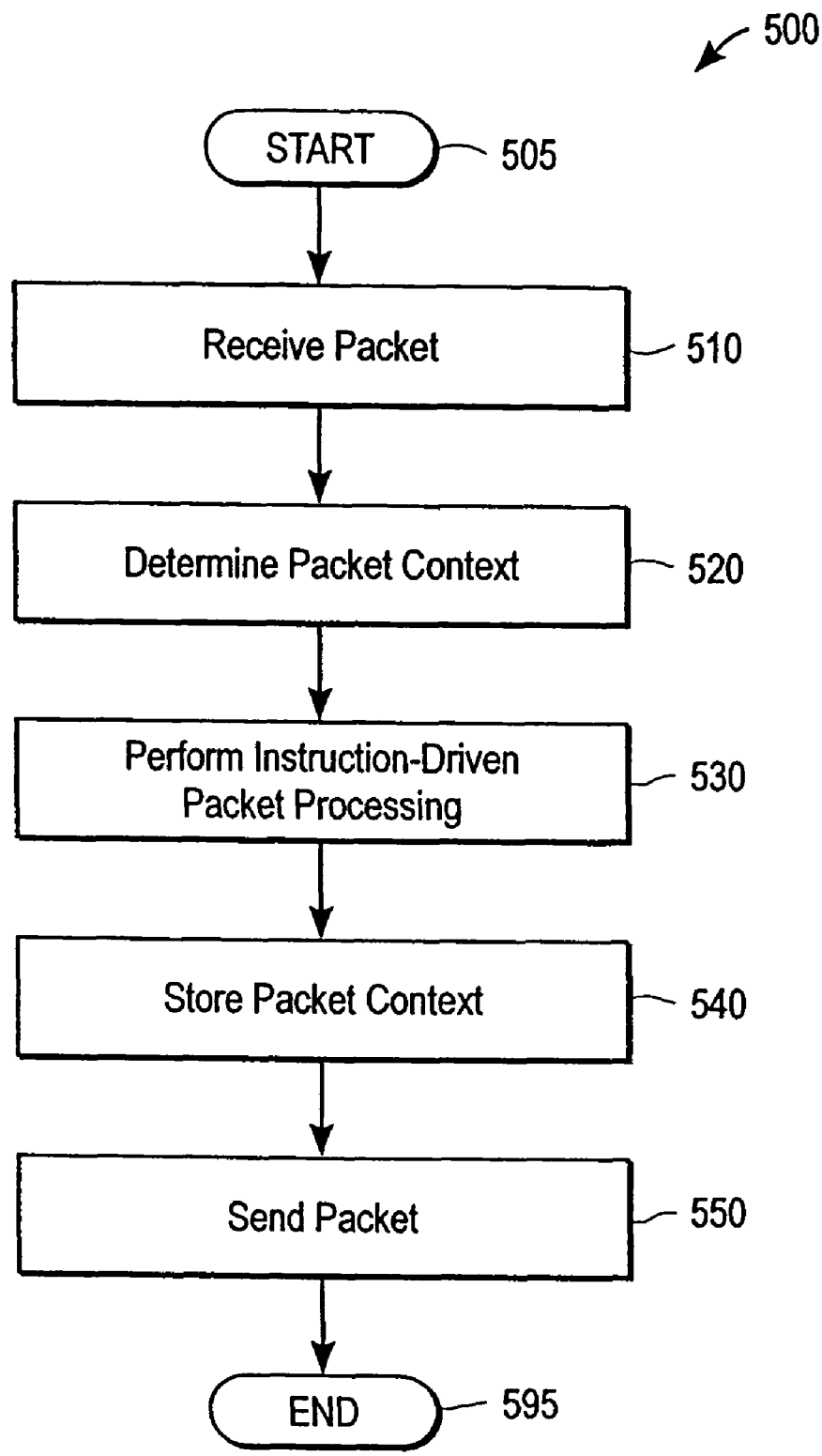
FIG. 5 is a flow chart illustrating the method of parsing network packets according to one embodiment of the present invention.

FIG. 5 is a flow chart illustrating the method 500 of parsing network packets according to one embodiment of the present invention. The parsing engine 210 receives 510 a packet from the flow sequencer unit 110 into the packet buffer 240. Before parsing, the parsing engine 210 determines 520 a parsing context for the packet as described below with respect to FIG. 6. Generally, if the packet is part of a packet flow, or is stateful, at least part of the parsing context is already stored in the flow state unit 220 or hash unit 216. By maintaining statefullness of packets, content from the packet flow appears as a single bit stream to the state-graph unit 230.

The parsing processor 120 performs 530 instruction-driven packet processing on the packet or packet flow as described below with reference to FIG. 7. Rather than merely identifying regular expression matches, the parsing instructions provide flexibility in parsing operations. For example, parsing instructions enable the packet processor unit 120 to extract the IP address from a packet and perform a look-up in the hash table 216. A parsing instruction in the hash look-up table 216 enables the packet processor 120 to skip the first 20 bytes of the packet and then extract the next four bytes. If the four extracted bytes match a fixed value, then additional actions can be taken. Also, the parsing instructions enable the parsing processor 120 to start pattern matching for predetermined patterns such as ".*abc", "virus.dat", "http", etc.

At the end of a packet, the parsing engine 210 stores 540 the parsing context for stateful packets in the flow state unit 220 and/or the hash unit 216. Also, the parsing engine 210 sends 550 the packet to the network processor unit 130 along with appropriate messages, or out of the network device 100.

Figure 6:
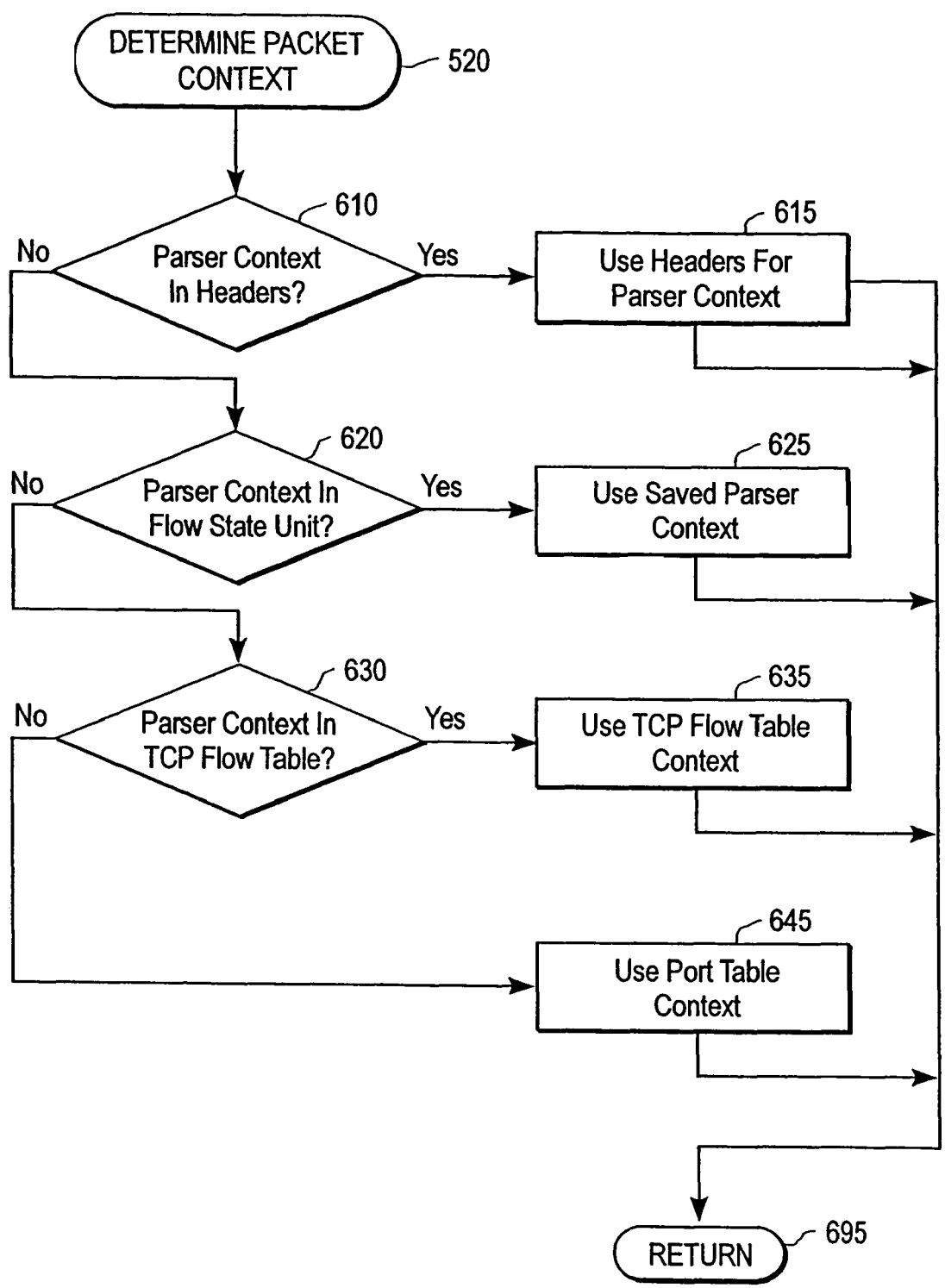
FIG. 6 is a flow chart illustrating the method of determining parsing context according to one embodiment of the present invention.

FIG. 6 is a flow chart illustrating the method 520 of determining parsing context according to one embodiment of the present invention. Note that FIG. 6 is merely an example which can be varied with different protocols, or by performing steps in a different order. The parsing engine 210 first determines whether packet context is contained in the headers 610 or other message from the flow sequencer 110. If so, the parsing engine 210 uses 615 the header information as parser context such as the next state. If not, the parsing engine 210 determines if a parser context is stored in the flow state unit 620. If so, the parsing engine 210 uses 625 saved parser context as identified, for example, by the flow_id.

Otherwise, if the parsing engine 210 determines that a TCP table contains parser context 630, it uses 635 a parsing context, or at least a portion thereof, from the TCP flow table. The parsing engine 210 checks a TCP flow table using a key. The parsing engine 210 generates the key by, for example, concatenating the TCP information discussed above. If the parsing engine 210 determines that the TCP table does not contain parser index 630, it uses 645 a parsing context, or portion thereof, from the port table.

Figure 7:
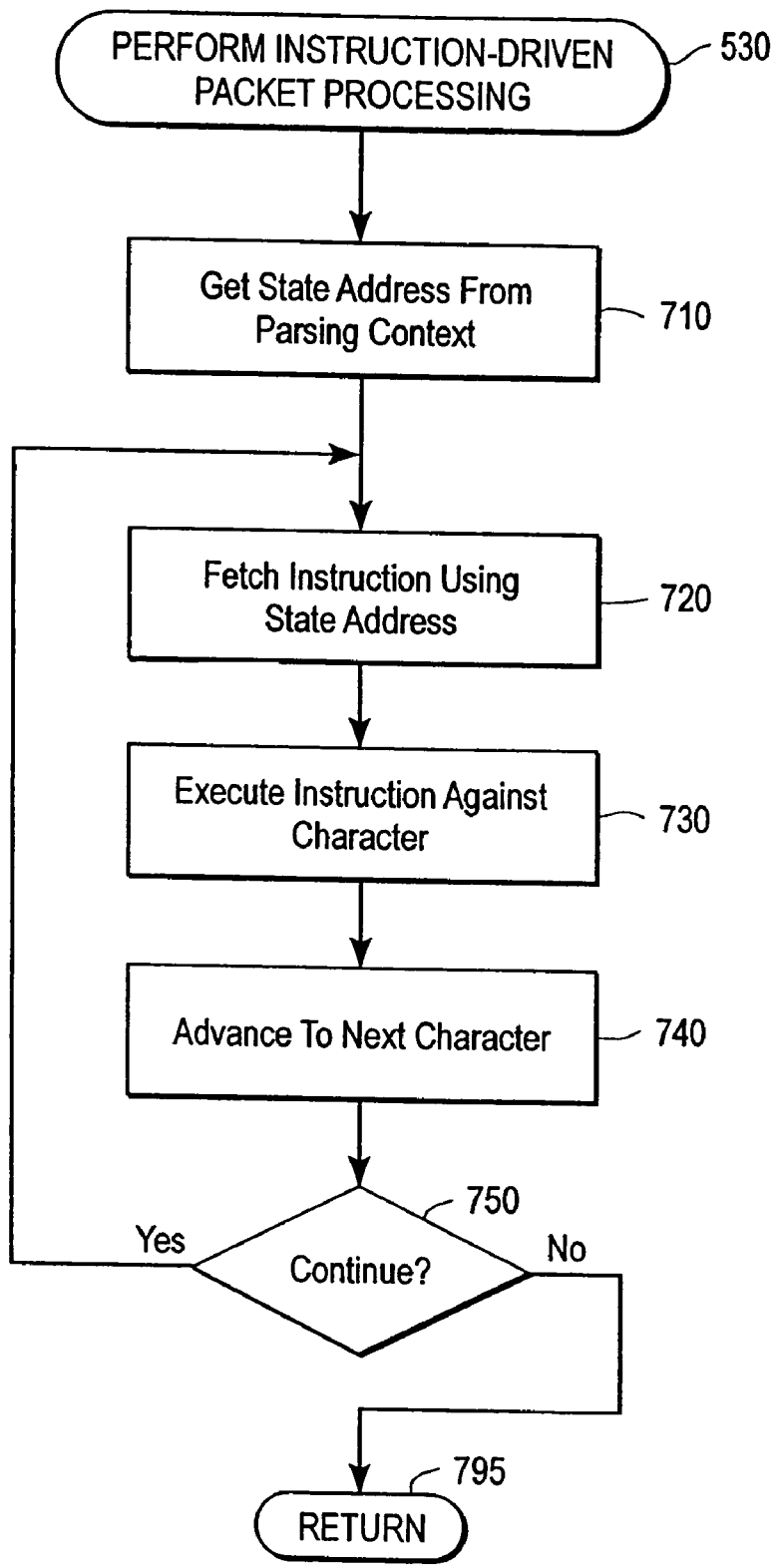
FIG. 7 is a flow chart illustrating the method of performing instruction-driven packet processing according to one embodiment of the present invention.

FIG. 7 is a flow chart illustrating the method 530 of performing instruction-driven packet processing according to one embodiment of the present invention. In the parse state, the I-bit is set to "1" to indicate that it contains a parsing instruction as shown above in Table 5. Thus, once the parsing context is received, the parsing engine 210 gets 710 the next state from the parsing context. The parsing engine 210 fetches 720 a parsing instruction from the state-graph unit 230 using the state address. The processing cores 212 execute 730 the parsing instruction against the character to determine a next state. The parsing engine 210 advances 740 to the next character, and if it is an end byte stream character 750, ends the process. Otherwise, the process continues fetching 720 parsing instructions at the next state end of the byte stream.

The above description is included to illustrate the operation of the preferred embodiments and is not meant to limit the scope of the invention. The scope of the invention is to instead be limited only by the following claims.

I claim:

1. A method of providing stateful flow of a byte stream having portions across a plurality of related network packets in a packet parsing processor, the method comprising:
   receiving a network packet having a portion of the byte stream;
   determining that the network packet is from the plurality of related network packets by retrieving a parsing context comprising a current parsing state of the byte stream; wherein retrieving the parsing context comprises accessing header information to retrieve the parsing context, and upon determining that the header information does not contain the parsing context, retrieving the parsing context from a storage element of the packet parsing processor based on the header information; and
   performing instruction-driven packet parsing on the portion responsive to the current parsing state.

2. The method of claim 1, further comprising:
   prior to receiving the network packet, storing the parsing context in the storage element in association with header information based on one or more packets from the plurality of related network packets.

3. The method of claim 2, wherein the current parsing state comprises a parsing instruction.

4. The method of claim 2, wherein the current parsing state comprises a plurality of potential next parsing states.

5. The method of claim 1, wherein determining that the network packet is from the plurality of related network packets comprises:
   determining a sequence information of the network packet based on header information in the network packet, the sequence information identifying the plurality of related network packets.

6. The method of claim 1, wherein the packet parsing processor is contained within a network device, the network device coupled to receive the plurality of related network packets from a network capable of operating at 10-Gbps or above, the network device performing one from the group containing:
   data packet routing, data packet forwarding, and data packet bridging.

7. The method of claim 1, wherein packet parsing supports one from the group containing:
   intrusion detection, quality of service, application recognition, virus detection, and an application-level firewall.

8. A method of providing stateful flow of a byte stream having portions across a plurality of related network packets in a packet parsing processor with an integrated flow state unit, the method comprising:

receiving a first network packet having a first portion of a byte stream from the plurality of related network packets;

storing a sequence information of the plurality of related network packets based on header information in the first network packet, the sequence information identifying the plurality of related network packets;

performing instruction-driven packet parsing on the first portion responsive to parsing instructions that traverse nodes of a state machine including memory locations representative of current parsing states and next parsing states;

storing a parsing context associated with the sequence information in a storage element of the packet parsing processor, the parsing context including a current parsing state of the byte stream and a plurality of potential next parsing states;

receiving a second network packet having a second portion of the byte stream;

determining that the second network packet is from the plurality of related network packets by accessing a header information of the second network packet to retrieve a parsing context, and upon determining that the header information of the second network packet does not contain a parsing context, retrieving the stored parsing context based on the sequence information derived from the header information; and performing instruction-driven packet parsing on the second portion responsive to the current parsing state.

9. An apparatus, comprising:
a packet parsing processor comprising circuitry that includes:
  a parsing engine having an input to receive a signal representing a network packet having a portion of a byte stream from a plurality of related network packets having portions of the byte stream, the parsing engine configured to determine that the network packet is from the plurality of related network packets based on header information in the network packet; and
  a flow state unit, having an input/output coupled to an input/output of the parsing engine, the flow state unit configured to retrieve a stored parsing context from a storage element of the packet parsing processor based on the header information, the stored parsing context comprising a current parsing state of the byte stream;
  wherein the parsing engine is configured to receive a parsing context from the header information of the network packet when the header information of the network packet contains the parsing context, and upon determining that the header information of the network packet does not contain the parsing context, the parsing engine is configured to receive the stored parsing context from the flow state unit;
wherein the parsing engine is configured to perform instruction-driven packet parsing on the portion responsive to at least the current parsing state.

10. The packet parsing processor of claim 9, wherein prior to the parsing engine receiving the network packet, the flow state unit is configured to store the stored parsing context in association with header information based on one or more packets from the plurality of related network packets.

11. The packet parsing processor of claim 10, wherein the current parsing state comprises a parsing instruction.

12. The packet parsing processor of claim 10, wherein the current parsing state comprises a plurality of potential next parsing states.

13. The packet parsing processor of claim 9, further comprising:
a sequencer, having an output coupled to the input of the parsing engine, the sequencer to determine sequence information of the network packet based on header information in the network packet, the sequence information identifying the plurality of related network packets.

14. The packet parsing processor of claim 9, wherein the packet parsing processor is contained within a network device, the network device coupled to receive the plurality of related network packets from a network capable of operating at 10-Gbps or above, the network device performing one from the group containing:
data packet routing, data packet forwarding, and data packet bridging.

15. The packet parsing processor of claim 9, wherein the instruction-driven packet parsing supports one from the group containing:
intrusion detection, quality of service, application recognition, virus detection, and an application-level firewall.

16. A computer program product, comprising a non-transitory computer-readable medium having computer program instructions and data embodied thereon for a method of providing stateful flow of a byte stream having portions across a plurality of related network packets in a packet parsing processor, the method comprising:
receiving a network packet having a portion of the byte stream;
determining that the network packet is from the plurality of related network packets by retrieving a parsing context comprising a current parsing state of the byte stream; wherein the parsing context is retrieved from header information when the header information contains the parsing context, and upon determining that the header information does not contain the parsing context, the parsing context is retrieved from a storage element of the packet parsing processor based on the header information; and
performing instruction-driven packet parsing on the portion responsive to the current parsing state.

17. The computer program product of claim 16, further comprising:
prior to receiving the network packet, storing the parsing context in association with header information based on one or more packets from the plurality of related network packets.

18. The computer program product of claim 17, wherein the current parsing state comprises a parsing instruction.

19. The computer program product of claim 17, wherein the current parsing state comprises a plurality of potential next parsing states.

20. The computer program product of claim 16, wherein determining that the network packet is from the plurality of network packets comprises:
determining a sequence information of the network packet based on header information in the network packet, the sequence information identifying the plurality of related network packets.

21. The computer program product of claim 16, wherein the packet parsing processor is contained within a network device, the network device coupled to receive the plurality of related network packets from a network capable of operating at 10-Gbps or above, the network device performing one from the group containing:
data packet routing, data packet forwarding, and data packet bridging.

22. The computer program product of claim 16, wherein packet parsing supports one from the group containing:
  intrusion detection, quality of service, application recognition, virus detection, and an application-level firewall.

23. A networking device, comprising:
  a memory; and
  one or more processors communicatively coupled to the memory, the one or more processors comprising:
    a parsing engine having an input to receive a signal representing a network packet having a portion of a byte stream from a plurality of related network packets having portions of the byte stream, the parsing engine configured to determine that the network packet is from the plurality of related network packets based on header information in the network packet; and
    a flow state unit, having an input/output coupled to an input/output of the parsing engine, the flow state unit configured to retrieve a stored parsing context from a storage element of the packet parsing processor based on the header information, the stored parsing context comprising a current parsing state of the byte stream;
    wherein the parsing engine is configured to receive a parsing context from the header information of the network packet when the header information of the network packet contains the parsing context, and upon determining that the header information of the network packet does not contain parsing context, the parsing engine receives the stored parsing context from the flow state unit;
  wherein the parsing engine performs instruction-driven packet parsing on the portion responsive to at least the current parsing state.

* * * * *